United States Patent
Inoue

(10) Patent No.: US 8,281,889 B2
(45) Date of Patent: Oct. 9, 2012

(54) SEAT STRUCTURE FOR VEHICLE AND VEHICLE INCORPORATING SAME

(75) Inventor: Yusuke Inoue, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 332 days.

(21) Appl. No.: 12/701,145

(22) Filed: Feb. 5, 2010

(65) Prior Publication Data

US 2010/0207416 A1    Aug. 19, 2010

(30) Foreign Application Priority Data

Feb. 18, 2009 (JP) ................................. 2009-035791

(51) Int. Cl.
*B62K 11/04* (2006.01)

(52) U.S. Cl. ....................... 180/219; 297/195.1; 297/214

(58) Field of Classification Search .................. 180/219; 297/195.1, 214
See application file for complete search history.

(56) References Cited

U.S. PATENT DOCUMENTS

| | | | | |
|---|---|---|---|---|
| 4,457,524 A | * | 7/1984 | Yoshiwara | 280/835 |
| 4,694,924 A | * | 9/1987 | Asakura et al. | 180/68.3 |
| RE34,072 E | * | 9/1992 | Asakura et al. | 180/68.3 |
| 2001/0022248 A1 | * | 9/2001 | Mori et al. | 180/219 |
| 2005/0126546 A1 | * | 6/2005 | Yagisawa | 123/509 |
| 2006/0175112 A1 | * | 8/2006 | Yoshida et al. | 180/229 |
| 2010/0206653 A1 | * | 8/2010 | Koike | 180/225 |

FOREIGN PATENT DOCUMENTS

JP            08-025489 B        3/1996

* cited by examiner

*Primary Examiner* — Kevin Hurley
(74) *Attorney, Agent, or Firm* — Carrier Blackman & Associates, P.C.; William D. Blackman; Joseph P. Carrier

(57) ABSTRACT

A seat structure for a vehicle, such as a motorcycle, includes a seat arranged rearwardly of a fuel tank mounted on a vehicle body frame. The seat includes a cushion member, and a bottom plate for holding the cushion member. The cushion member is made of an elastic material. The bottom plate is fixed to the vehicle body frame and to the fuel tank. The cushion member includes a bulging portion which bulges forwardly from a front end portion of the bottom plate and onto an upper surface of a stepped portion of the fuel tank. The bulging portion is supported on the upper surface of the fuel tank.

17 Claims, 5 Drawing Sheets

SEAT STRUCTURE FOR VEHICLE AND VEHICLE INCORPORATING SAME

CROSS-REFERENCE TO RELATED APPLICATIONS

The present invention claims priority under 35 USC 119 based on Japanese patent application No. 2009-035791, filed on Feb. 18, 2009. The entire subject matter of this priority document, including specification, claims and drawings thereof, is incorporated by reference herein.

BACKGROUND OF THE INVENTION

1. Field of the Invention

The present invention relates to a seat structure for a vehicle, such as a motorcycle, and to a vehicle incorporating the same. More particularly, the present invention relates to a seat structure including a seat arranged rearwardly of a fuel tank mounted on a vehicle body frame, and the seat including a cushion member supported on a bottom plate secured to the vehicle body frame and the fuel tank, and to a vehicle incorporating the same.

2. Description of the Background Art

There is known seat structure for a vehicle, such as a motorcycle, in which a front portion of a seat arranged rearwardly of a fuel tank extends to an upper surface of a rear portion of the fuel tank. Such seat structure is provided for securing a sitting surface of the seat by taking a case where a rider sits on a front side of the seat during operating a vehicle, such as an off-road vehicle.

In general, a seat for a vehicle includes: a bottom plate, a cushion member placed on the bottom plate so as to cover the bottom plate from above, and a surface skin (cover) which covers the cushion member. An example of such seat for a vehicle is disclosed in the Japanese Patent Document JP-B-8-25489.

However, in the above-mentioned related art (including the disclosure of the Japanese Patent Document JP-B-8-25489), it is necessary to reduce a thickness of the cushion member on a forwardly extending front end portion of the bottom plate of the seat. Accordingly, there exists a drawback that the motorcycle of the related art, during operation thereof, cannot provide a cushion performance at the front end portion of the seat. In order to overcome with such a situation, it may be possible to increase a thickness of the cushion member at the front end portion of the seat. In this case, however, the continuity of the seat structure cannot be ensured in a region ranging from the fuel tank to the seat.

The present invention has been made to overcome such drawbacks of the existing seat structure for a vehicle. Accordingly, it is one of the objects of the present invention to provide the seat structure for a vehicle which ensures desirable cushion performance even when a sitting position of an operator of the vehicle is at a front portion of the seat.

SUMMARY OF THE INVENTION

In order to achieve the above objects, the present invention according a first aspect thereof provides a seat structure for a vehicle. The seat structure includes a seat (for example, a seat 14 in an embodiment) arranged rearwardly of a fuel tank (for example, a fuel tank 13 in the embodiment) mounted on a vehicle body frame (for example, a vehicle-body frame 1 in the embodiment) of a vehicle (e.g., motorcycle). The seat includes a cushion member (for example, a cushion member 40 in the embodiment) made of an elastic material and a bottom plate (for example, a bottom plate 41 in the embodiment) which holds the cushion member.

The bottom plate is fixed to the vehicle body frame. The cushion member includes a bulging portion (for example, a bulging portion 50 in the embodiment) which bulges forwardly from a front end portion of the bottom plate and onto a wall surface of the fuel tank (for example, an upper surface 34a of a stepped portion 34 in the embodiment), and is supported on the wall surface of the fuel tank.

The present invention according to a second aspect thereof, in addition to the first aspect, is characterized in that the front end portion of the bottom plate is inclined toward a fuel tank side.

The present invention according to a third aspect thereof, in addition to the first aspect, is characterized in that a stepped portion (for example, the stepped portion 34 in the embodiment) which is indented downward is formed on a rear portion of an upper surface of the fuel tank, that a front portion (for example, a front portion 37 in the embodiment) of the seat is arranged on the stepped portion, and that a front upper surface (for example, a front upper surface 13a of an upper wall 33 in the embodiment) of the fuel tank and an upper surface (for example, an upper surface 51 in the embodiment) of the cushion member of the seat are arranged continuous connected with each other.

Advantages of the Invention

According to the first aspect of the present invention, the seat structure is configured such that at the front end portion of the seat, the bottom plate is not extended below a portion of the cushion member (i.e., the portion of the cushion member is not supported by the bottom plate), and such portion of the cushion member is supported on the fuel tank. Such configuration is advantageous since it is possible to increase a thickness of the cushion member (i.e., the portion of the cushion member) by an amount corresponding to the non-presence of the bottom plate below the portion of the cushion member.

Hence, during operation of the vehicle, it is possible to ensure the cushion performance of the seat even at the front end portion of the seat. Therefore, the seat structure for a vehicle according to the present invention is advantageous for operating the vehicle in undulated or uneven terrain, where a rider may ride on a vehicle with the rider's sitting position set at a front portion of the seat.

According to the second aspect of the present invention, the front end portion of the bottom plate is inclined toward the fuel tank side. Due to such a configuration of the bottom plate, it is possible to secure a large space in which the cushion member is arranged on the bottom plate thereby enhancing cushion performance of the cushion member.

According to the third aspect of the present invention, when a rider occupying the seat moves his sitting position to the front side, the rider feels no discomfort since the fuel tank and the seat are arranged continuous with each other. Further, the present invention according to the third aspect also has an advantage in that the seat structure for a vehicle has excellent design characteristics.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Next, an embodiment of the present invention is explained in conjunction with drawings.

Figure 1:
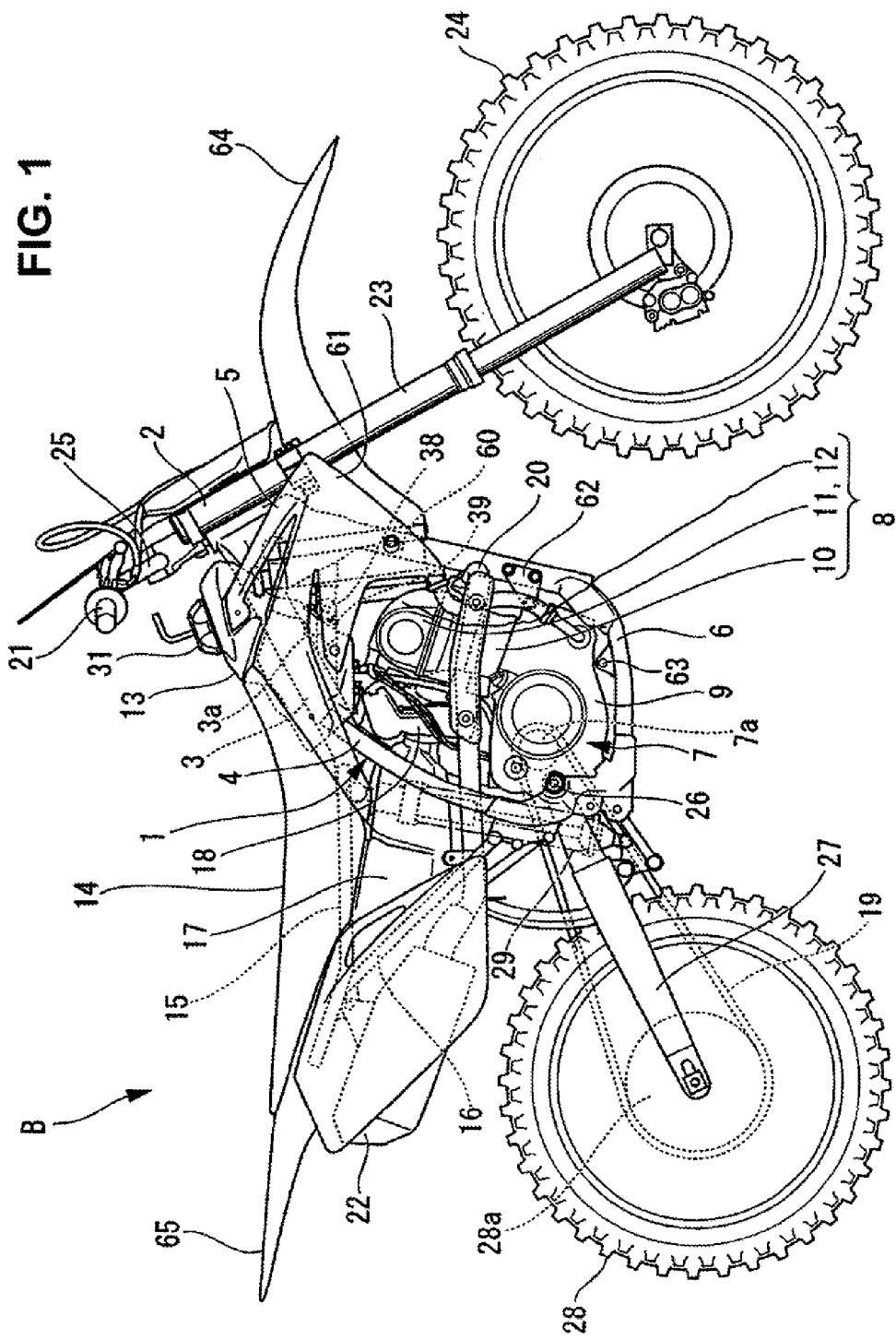
FIG. 1 is a side view of a motorcycle according to an illustrative embodiment of the present invention.
Figure 2:
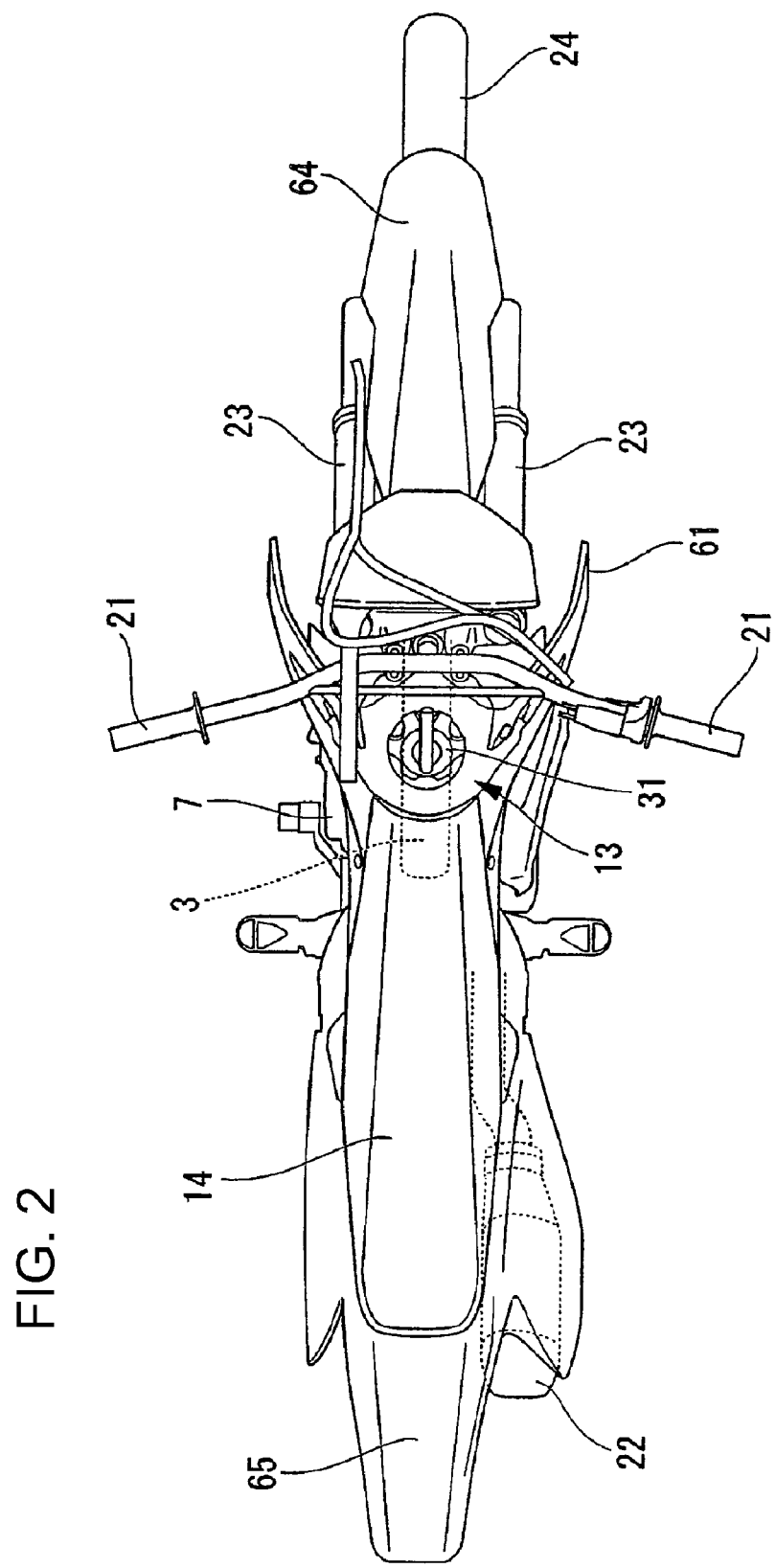
FIG. 2 is a plan view of a motorcycle according to the illustrative embodiment of the present invention.

FIG. 1 is a side view of an off-road motorcycle B. FIG. 2 is a plan view of the off-road motorcycle B.

As shown in FIG. 1 and FIG. 2, the motorcycle B includes a vehicle-body frame 1 having a head pipe 2, a main frame 3, a center frame 4, a down frame 5, and a lower frame 6. The main frame 3, the center frame 4, the down frame 5, and the lower frame 6 are connected to each other in a loop shape profile. An engine 7 is supported inside the loop shape profile formed by connecting the frames. The engine 7 mainly includes a cylinder 8 and a crankcase 9.

The main frame 3 extends linearly and obliquely in a downward and rearward direction at the center of a vehicle body. The main frame is arranged at a position above the engine 7. The main frame 3 is connected to upper end portions of a pair of left and right center frames 4 which extends in the vertical direction behind the fuel tank 13 as well as behind the engine 7.

The down frame 5 is arranged in front of the engine 7. The down frame 5 extends linearly and obliquely in the downward and rearward direction at the center of the vehicle body. The down frame 5 has a lower end portion thereof connected to front end portions of a pair of left and right lower frames 6. The respective lower frames 6 are bent toward an area below the engine 7 from a front lower portion of the engine 7. The lower frames 6 extend substantially linearly in the rearward direction, and have rear end portions thereof connected to lower end portions of the respective center frames 4.

The engine 7 is a water-cooled 4-cycle engine. The cylinder 8 is mounted on a front portion of the crank case 9 in an upright posture such that an axis of the cylinder 8 extends substantially vertically. As shown in FIG. 1, the cylinder 8 includes a cylinder block 10, a cylinder head 11, and a head cover 12 in this order from below to above. A longitudinal length of the engine 7 is shortened by mounting the cylinder 8 in an upright position. Such mounting of the cylinder 8 allows the engine 7 to be suitable for an off-road vehicle.

Figure 3:
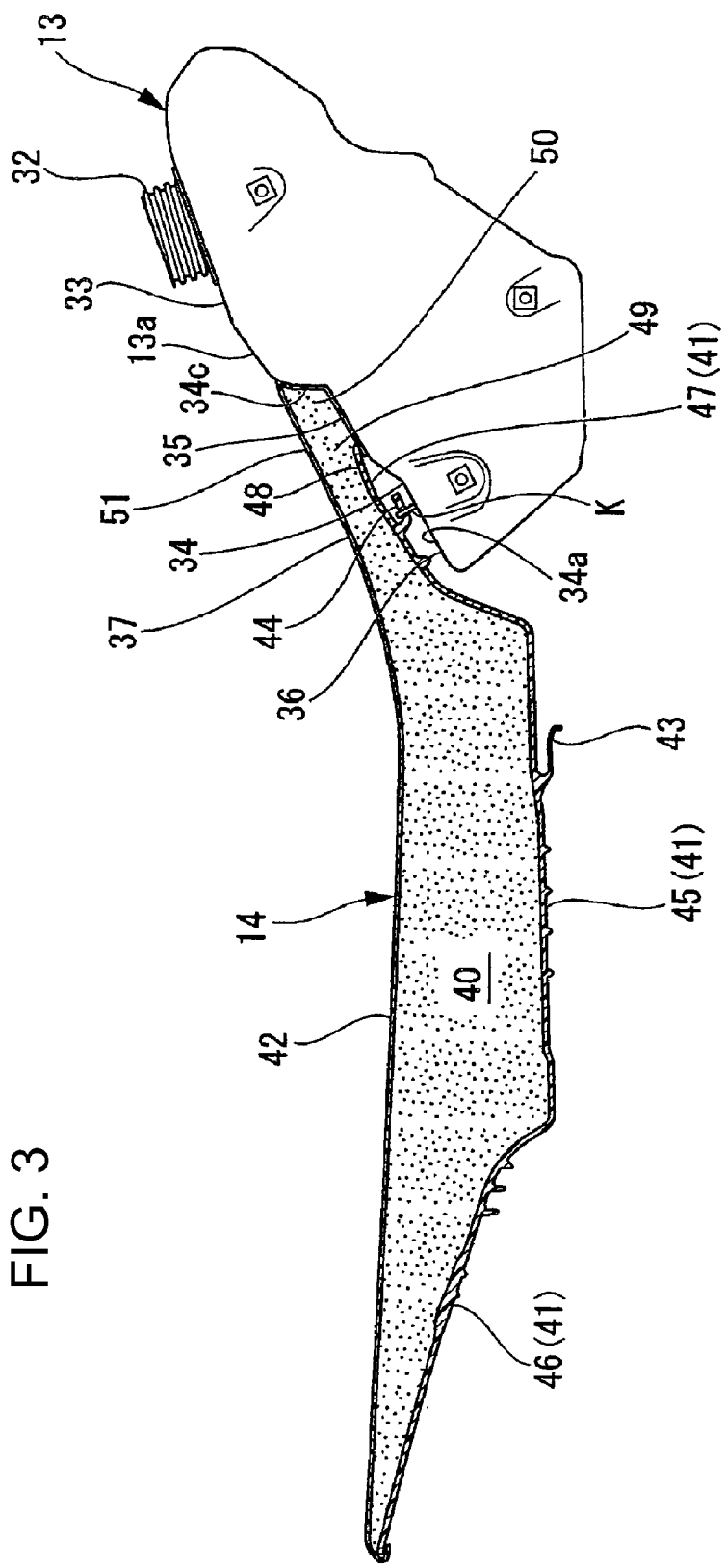
FIG. 3 is a side view showing a fuel tank and a seat structure according to the illustrative embodiment of the present invention.

A fuel tank 13 is arranged above the engine 7. The fuel tank is supported on the main frame 3. A seat 14 is arranged rearwardly of the fuel tank 13. The seat 14 is supported on seat rails 15 which extend in the rearward direction from an upper end of the center frame 4. The seat is also supported on the fuel tank (FIG. 3). A rear frame 16 is arranged below the seat rails 15. An air cleaner 17 is supported on the seat rails 15 and on the rear frame 16. The air cleaner supplies air to the cylinder head 11 from a vehicle-body rear side using a carburetor 18.

An exhaust pipe 20 is mounted on a front portion of the cylinder 8. The exhaust pipe 20 extends to an area in front of the crank case 9 from a front portion of the cylinder 8, and is bent toward a right side, and thereafter is routed around a right side of the vehicle body in the rearward direction. A muffler 22 extends from the exhaust pipe 20 in the rightward and rearward direction. A rear end portion of the muffler 22 is supported on the rear frame 16.

A front fork 23 is supported on the head pipe 2. A front wheel 24 supported on a lower end portion of the front fork 23 is steered by a handle 25. A grip 21 is mounted on left and right end portions of the handle 25. The grip 21 mounted on the right end portion of the handle 25 constitutes a throttle-use grip 21. Front end portions of rear swing arms 27 are swingably supported on the center frame 4 using a pivot shaft 26.

A rear wheel 28 is supported on rear end portions of the rear swing arms 27. The rear wheel 28 is driven by a drive chain 19 which extends between a drive sprocket wheel 7a of the engine 7 and a driven sprocket wheel 28a of the rear wheel 28. The drive chain 19 is wound around the drive sprocket wheel 7a and the driven sprocket wheel 28a. The drive chain 19 is routed around the rear swing arm 27 in the longitudinal direction on a left side of the vehicle body opposite to the exhaust pipe 20. The drive chain 19 is moved vertically along with the vertical swinging of the rear swing arm 27 about the pivot shaft 26.

Further, a shock absorber 29 for rear suspension is arranged between the rear swing arm 27 and a rear end portion of the center frame 4. As shown in FIG. 1, the motorcycle B includes a radiator 60, a radiator shroud 61, engine mounting portions 62, 63, a front fender 64, and a rear fender 65.

Figure 4:
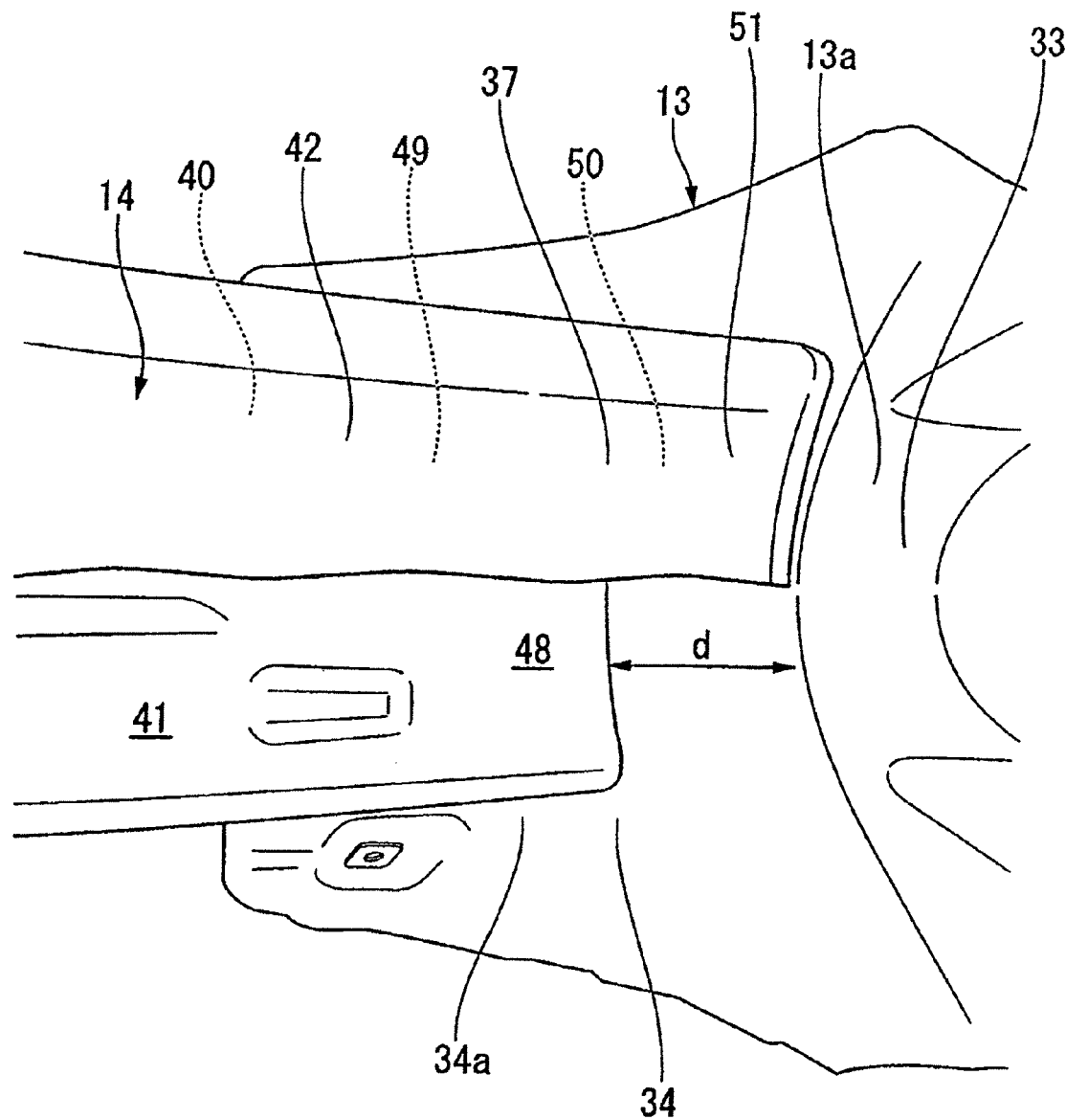
FIG. 4 is a plan view of an essential part, partly broken away, of the motorcycle shown in FIG. 2.
Figure 5:
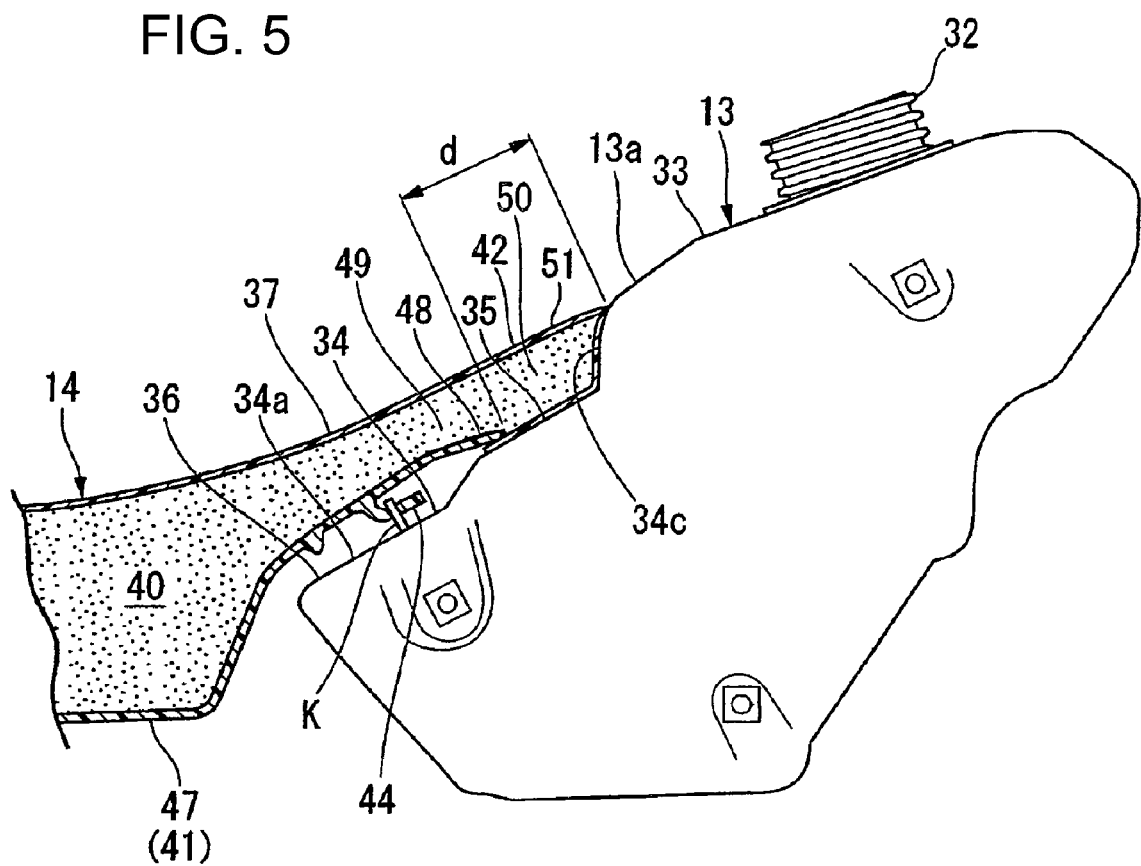
FIG. 5 is an enlarged view of an essential part of the seat structure shown in FIG. 3.

As shown in FIGS. 3 through 5, the fuel tank 13 is formed by molding using a resin. The fuel tank 13 includes an upper wall 33 having an oil filling port 32 formed therein at front side portion thereof. The oil filling port is closed by a filler cap 31 (see FIG. 1 and FIG. 2). The fuel tank also includes a stepped portion 34 is formed on the upper wall 33 behind the oil filling port 32 by lowering a level of the upper wall 33. The stepped portion 34 is indented downwardly.

An upper surface 34a of the stepped portion 34 differs in height between a front portion and a rear portion thereof. That is, as shown in FIG. 3, a front side (front portion) 35 of the upper surface 34a is situated at a position higher than a position of a rear side (rear portion) 36 of the upper surface 34a. The stepped portion 34 is secured as an arrangement space for the seat 14, i.e., the stepped portion is configured to receive the front portion 37 of the seat 14. The front portion 37 of the seat 14 is arranged on the upper surface 34a of the stepped portion 34.

Here, as shown in FIGS. 1 and 2, the fuel tank 13 is arranged to straddle in a vehicle width direction on a rear portion of the main frame 3 and in front of a joint portion of the main frame 3 and the respective center frames 4. A support frame 3a is arranged in an extending manner at a corner portion between the main frame 3 and the head pipe 2. The fuel tank 13 is fixed to the support frame 3a by using mounting brackets 38 which are interposed between both lower surfaces of the fuel tank 13 and both side portions of the support frame 3a by using bolts 39.

The seat 14 includes a cushion member 40, and a bottom plate 41 which holds the cushion member 40. The cushion member 40 is formed of an elastic material. The seat 14 is fixed to the seat rail 15. The seat 14 is formed by fixing a surface skin member 42 which secures (and covers) the cushion member 40 to the bottom plate 41.

The bottom plate 41 is a member made of a hard resin. The bottom plate is fixed to the seat rail 15 using a lock mechanism in a state such that a first hook 43 formed on a longitudinal center portion of the bottom plate 41 is engaged with a first engaging portion (not shown) of the seat rail 15. A second hook 44 formed on a longitudinal front portion of the bottom plate 41 is engaged with a second engaging portion K formed on the upper surface 34a of the stepped portion 34 of the fuel tank 13. Accordingly, the stepped portion 34 is provided for securing a clearance between the bottom plate 41 and fuel tank 13 for allowing the second hook 44 to pass through the clearance at the time of mounting the seat 14 on the seat rail 15.

The bottom plate mainly includes a flat portion 45, a rear portion 46 and a front portion 47. The flat portion 45 of the bottom plate 41 is formed on a longitudinal center portion of the bottom plate 41. The rear portion 46 of the bottom plate 41 gradually extends from the flat portion obliquely in the upward direction. The front portion 47 of the bottom plate 41 extends from the flat portion 45, and is raised toward the stepped portion 34 of the fuel tank 13.

A front end portion of the front portion 47 extends toward a front side 35 of the upper surface 34a of the stepped portion 34. The front portion of the front portion 47 is bent downwardly so as to be inclined toward a fuel tank 13 side before the front end portion reaches a front surface 34c of the stepped portion 34. A certain, predetermined distance d is secured between a distal end of the bent portion 48 and the front surface 34c of the stepped portion 34.

The cushion member 40 is situated on an upper portion of the bottom plate 41. The cushion member 40 is covered with the surface skin member 42. A periphery of the surface skin member 42 is fixed to the bottom plate 41.

A front end portion 49 of the cushion member 40 includes a bulging portion 50 which bulges onto a wall surface of the fuel tank 13 between a distal end of the bent portion 48 formed on the front end portion of the bottom plate 41 and the front surface 34c of the stepped portion 34 of the fuel tank 13. More specifically, the bulging portion 50 bulges onto to the front side 35 of the upper surface 34a of the stepped portion 34, and is supported on the wall surface of the fuel tank 13.

In other words, the bottom plate 41 does not extend below (i.e. is not present below) the bulging portion 50. The front side 35 of the upper surface 34a of the stepped portion 34 of the fuel tank 13 is positioned below the bulging portion 50. The bulging portion 50 is covered with the surface skin member 42 in a wrapping manner. The surface skin member 42 is fixed to the bottom plate 41 in a manner such that the surface skin member 42 extends and covers a lower side of the bent portion 48 of the bottom plate 41.

As shown in FIG. 4, when viewed in a plan view, a width of the front end portion of the seat 14 is set smaller than a width of the fuel tank 13. A front edge portion of the bulging portion 50 of the cushion member 40 which constitutes the front end portion of the seat 14 is warped rearward thus forming an arcuate shape.

Further, a front upper surface 13a of the upper wall 33 of the fuel tank 13 and an upper surface 51 of the bulging portion 50 of the cushion member 40 which bulges toward the stepped portion 34 of the fuel tank 13 are arranged continuous with each other toward an upper surface 51 of the surface skin member 42.

According to the illustrative embodiment discussed above, even when a rider who occupies (sits on) the seat 14 moves his sitting position to the front end portion 49 of the cushion member 40 of the seat 14 positioned at the stepped portion 34 of the fuel tank 13, the rider is directly supported on the front side 35 of the upper surface 34a of the stepped portion 34 of the fuel tank 13. It may be noted that on the front side 35 of the stepped portion 34 of the fuel tank 13, the bottom plate 41 is not present within a range of distance d in front of the bent portion 48 of the bottom plate 41, and only the bulging portion 50 of the cushion member 40 is present.

Accordingly, it is possible to enhance the cushion performance due to the provision of the bulging portion 50 where a sufficient thickness of the cushion member 40 is ensured. As a result, the seat structure for a vehicle according to the present invention is advantageous particularly when a rider may ride a vehicle with his sitting position set at a front side of the seat for operating the vehicle in an undulated, non-planer terrain.

Further, since the bulging portion 50 of the cushion member 40 is supported on the front side 35 of the upper surface 34a of the stepped portion 34 of the fuel tank 13 at a position where the bottom plate 41 is not extended, and the bent portion 48 is formed on the bottom plate 41 particularly before the bulging portion 50, a thickness of the cushion member 40 at the bent portion 48 above the bottom plate 41 can be also increased by an amount corresponding to downward bending of the bent portion 48. Such increase in thickness of the cushion member 40 enhances cushioning performance of the cushion member 40 above the bent portion 48 of the bottom plate 41 behind the bulging portion 50 of the cushion member 40.

Furthermore, the front portion 37 of the seat 14 is arranged on the stepped portion 34 of the fuel tank 13, and the front upper surface 13a of the upper wall 33 of the fuel tank 13 and the upper surface 51 of the surface skin of the bulging portion 50 of the cushion member 40 which bulges toward the stepped portion 34 of the fuel tank 13 are arranged continuous with each other. Accordingly, it is possible to impart continuity between the front upper surface 13a of the upper wall 33 of the fuel tank 13 and the upper surface 51 of the surface skin 42 which constitutes the upper surface 51 of the seat 14. Thus, it is possible to enhance appearance property of the vehicle while ensuring the cushioning characteristics by increasing the thickness of the cushion member 40 at the front portion 37 of the seat 14.

Further, since the fuel tank 13 and the seat 14 are arranged continuous with each other (or may be connected to each other), there is no possibility that a rider feels discomfort when the rider operating the vehicle sits on the seat 14 moves his sitting position toward the front side of the seat.

As will be appreciated, present invention is not limited to the above-mentioned embodiment and is also applicable to, for example, a four-wheeled buggy vehicle besides a motorcycle.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A seat structure for a vehicle, said vehicle comprising:
a vehicle body frame;
a fuel tank mounted on the vehicle body frame, the fuel tank having an upper surface with a stepped portion formed on a rear portion thereof, said stepped portion being indented downwardly; and a seat arranged rearwardly of said fuel tank, said seat comprising:
a cushion member made of an elastic material; and
a bottom plate which holds the cushion member, said bottom plate being fixed to the vehicle body frame,
wherein said cushion member includes a bulging portion which bulges forwardly from a front end portion of the bottom plate and onto a wall surface of the fuel tank, and wherein said bulging portion is supported on a wall surface of the fuel tank;
wherein the seat comprises a front portion arranged on the stepped portion of the fuel tank; and
wherein a front upper surface of the fuel tank and an upper surface of the cushion member are arranged substantially continuous with each other.

2. A seat structure for a vehicle according to claim 1, wherein the front end portion of the bottom plate is inclined towards a side of said fuel tank.

3. A seat structure for a vehicle according to claim 1, wherein a predetermined distance is formed between a distal end of the front portion of the bottom plate and a front surface of the stepped portion.

4. A seat structure for a vehicle according to claim 1, wherein said front portion of the bottom plate comprises a bent portion; and wherein a predetermined distance is formed between a distal end of the bent portion and a front surface of the stepped portion.

5. A seat structure for a vehicle according to claim 1, wherein said bottom plate comprises a hook formed thereon; and said stepped portion of the fuel tank comprises an engaging member for receiving said hook therein.

6. A seat structure for a vehicle according to claim 1, further comprising seat rails connected to said vehicle body frame;
wherein said bottom plate comprises a first hook and a second hook formed thereon;
wherein said stepped portion of the fuel tank comprises a first engaging member for receiving said first hook therein; and
wherein at least one of said seat rails includes a second engaging member for receiving said second hook therein.

7. A seat structure for a vehicle according to claim 1, wherein said vehicle is an off-road type motorcycle.

8. An off-road vehicle, comprising:
a vehicle body frame having seat rails extending therefrom;
a fuel tank mounted on the vehicle body frame, the fuel tank having an upper surface with a stepped portion formed on a rear portion thereof, said stepped portion being indented downwardly; and
a seat extending rearwardly of said fuel tank wherein said seat comprises:
a cushion member; and
a bottom plate for supporting the cushion member, said bottom plate being fixed to the seat rails and to the fuel tank;
wherein said cushion member includes a bulging portion which bulges forwardly from a front end portion of the bottom plate and onto a wall surface of the fuel tank, said bulging portion supported on a wall surface of the fuel tank,
wherein the seat comprises a front portion arranged on the stepped portion of the fuel tank; and
wherein an upper surface of a front portion of the fuel tank and an upper surface of the cushion member of the seat are arranged substantially continuous with each other.

9. An off-road vehicle according to claim 8, wherein the front end portion of the bottom plate is inclined towards said fuel tank.

10. An off-road vehicle according to claim 8, wherein a predetermined distance is formed between a distal end of the front portion of the bottom plate and a front surface of the stepped portion.

11. An off-road vehicle according to claim 8, wherein said front portion of the bottom plate comprises a bent portion; and wherein a predetermined distance is formed between a distal end of the bent portion and a front surface of the stepped portion.

12. An off-road vehicle according to claim 8, wherein said bottom plate comprises a hook formed thereon; and said stepped portion of the fuel tank comprises an engaging member for receiving said hook therein.

13. An off-road vehicle according to claim 8, wherein said bottom plate has a first hook and a second hook formed thereon;
wherein said stepped portion of the fuel tank comprises a first engaging member for receiving said first hook therein; and
wherein at least one of said seat rails includes a second engaging member for receiving said second hook therein.

14. A motorcycle, comprising:
a body frame;
a plurality of seat rails operatively supported by the body frame;
a fuel tank mounted on the body frame, the fuel tank having an upper surface with a stepped portion formed on a rear portion thereof, said stepped portion being indented downwardly; and
a seat comprising
a cushion member; and
a bottom plate for supporting the cushion member, said bottom plate being fixed to the seat rails and to the fuel tank;
wherein:
said cushion member includes a bulging portion which bulges forwardly from a front end portion of the bottom plate and onto a wall surface of the fuel tank;
said bulging portion is supported on a wall surface of the fuel tank;
said bottom plate comprises a front portion arranged on the stepped portion of the fuel tank; and
an upper surface of a front portion of the fuel tank and an upper surface of the cushion member of the seat are arranged substantially continuous with each other.

15. A motorcycle according to claim 14, wherein the front end portion of the bottom plate is inclined towards said fuel tank.

16. A motorcycle according to claim 14, wherein a predetermined distance is formed between a distal end of the front portion of the bottom plate and a front surface of the stepped portion.

17. A motorcycle according to claim 14, wherein said front portion of the bottom plate comprises a bent portion; and wherein a predetermined distance is formed between a distal end of the bent portion and a front surface of the stepped portion.

* * * * *